(12) United States Patent
Derrick

(10) Patent No.: US 6,464,248 B2
(45) Date of Patent: Oct. 15, 2002

(54) GAS BAG COVER WITH BURST LINE

(75) Inventor: John-Oliver Derrick, Hettstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/761,873

(22) Filed: Jan. 17, 2001

(65) Prior Publication Data

US 2001/0009326 A1 Jul. 26, 2001

(30) Foreign Application Priority Data

Jan. 20, 2000 (DE) .......................................... 200 00 956

(51) Int. Cl.$^7$ ............................................... B60R 21/20
(52) U.S. Cl. ..................................... 280/728.3; 280/731
(58) Field of Search ........................... 280/728.3, 728.1, 280/731, 732

(56) References Cited

U.S. PATENT DOCUMENTS

| | | | | |
|---|---|---|---|---|
| 4,995,638 A | * | 2/1991 | Shinto et al. ................ | 280/731 |
| 5,499,842 A | | 3/1996 | Yamamoto et al. | |
| 5,524,922 A | * | 6/1996 | Soderquist ............... | 280/728.3 |
| 5,893,581 A | | 4/1999 | Niederman | |
| 5,913,534 A | * | 6/1999 | Klingauf .................. | 280/728.3 |
| 5,971,429 A | * | 10/1999 | Bramberger et al. ........ | 280/731 |
| 5,975,562 A | * | 11/1999 | Yamamoto et al. ...... | 280/728.3 |
| 6,003,895 A | * | 12/1999 | Niwa et al. ............... | 280/728.3 |
| 6,135,489 A | * | 10/2000 | Bowers .................... | 280/728.3 |
| 6,250,669 B1 | * | 6/2001 | Ohmiya ....................... | 280/732 |

FOREIGN PATENT DOCUMENTS

| | | | | |
|---|---|---|---|---|
| DE | 19626416 | | 1/1998 | |
| DE | 19701106 | | 7/1998 | |
| DE | 19829755 | | 1/2000 | |
| DE | 29913741 | | 1/2000 | |
| EP | 0844142 | | 5/1998 | |
| JP | 403143752 A | * | 6/1991 | ................. 280/731 |
| JP | 405131888 A | * | 5/1993 | ............. 280/728.3 |
| JP | 11034777 | | 2/1999 | |
| JP | 11301398 | | 11/1999 | |

* cited by examiner

Primary Examiner—Brian L. Johnson
Assistant Examiner—Kelly E Campbell
(74) Attorney, Agent, or Firm—Tarolli, Sundheim, Covell, Tummino & Szabo L.L.P.

(57) ABSTRACT

A gas bag cover for a vehicle occupant restraint system has an inner side facing a gas bag to be covered and a wall thickness. The gas bag cover comprises at least one burst line being grooved into the cover from the inner side up to a predefined remaining wall thickness. The burst line comprises an initial point at which the remaining wall thickness has its minimum. The gas bag cover further comprises reinforcement ribs formed on the inner side of the cover, extending along a line which is tangent to the initial point of the burst line.

4 Claims, 1 Drawing Sheet

GAS BAG COVER WITH BURST LINE

FIELD OF THE INVENTION

The invention relates to a gas bag cover for a vehicle occupant restraint system, comprising a burst line grooved into the cover from the inner side.

BACKGROUND OF THE INVENTION

Tests have demonstrated that upon bursting of the gas bag cover stress concentrations may occur not only at the initial point but also at other locations. More particularly, if a structure has been applied to the outer side of the cover, for instance a depression or holes for securing a logo badge, the notch effect of these structures results in increased stresses. In this case, there is the risk of the cover not bursting along the provided burst line beginning at the initial point, but at just this location of maximum stress, i.e. for example in the region of an existing badge. This results in the gas bag not deploying as intended and thus in detrimenting proper functioning of the occupant restraint system. Apart from this a danger may arise in the badge releasing from the cover, constituting an additional risk of injury.

The invention provides a gas bag cover which on deployment of the gas bag begins to burst at a precisely predefined point.

BRIEF DESCRIPTION OF THE INVENTION

For this purpose, a gas bag cover for a vehicle occupant restraint system, having an inner side facing a gas bag to be covered and a wall thickness, comprises at least one burst line being grooved into the cover from the inner side up to a predefined remaining wall thickness, the burst line comprising an initial point at which the remaining wall thickness has its minimum, and the gas bag cover further comprises reinforcement ribs formed on the inner side of the cover, the reinforcement ribs extending along a line which is tangent to the initial point. This assures that the stresses are directed in the cover to the initial point where the bursting action precisely commences.

In accordance with one embodiment of the invention the gas bag cover comprises a badge which is applied to said cover, with the reinforcement ribs running around this badge. Thus a stress concentration in the region of the badge resulting in the cover bursting there is avoided.

BRIEF DESCRIPTION OF THE DRAWINGS

Further advantages of the invention read from the description of the preferred embodiment as illustrated in the attached drawing in which.

DETAILED DESCRIPTION OF THE INVENTION

Figure 1:
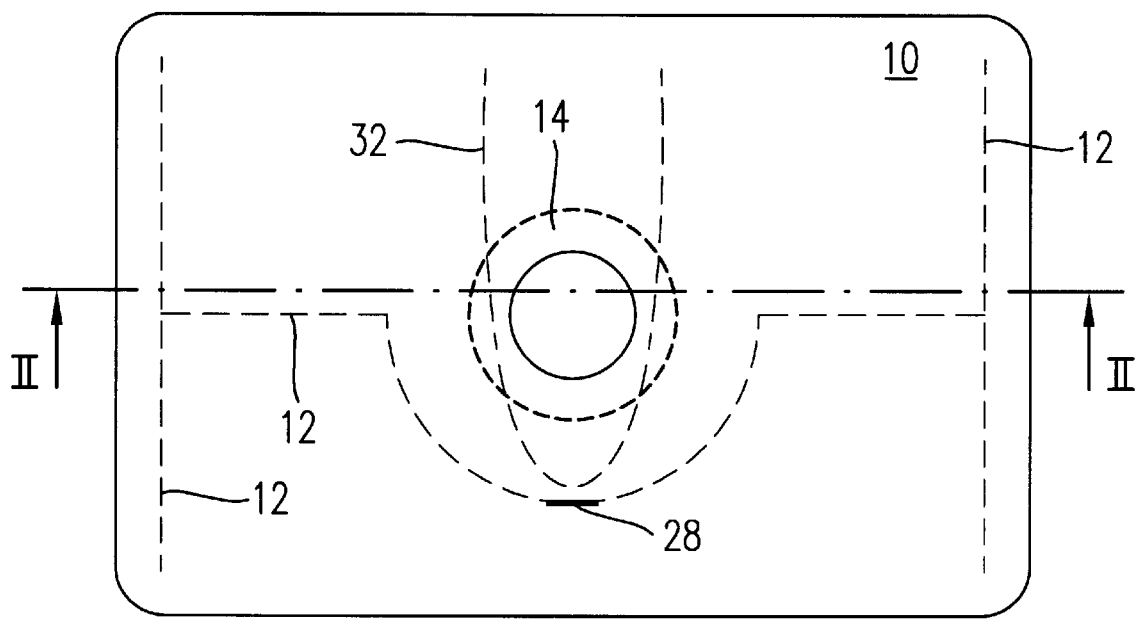
FIG. 1 is an overall view of the gas bag cover in accordance with the invention from the side facing the vehicle occupant.

Referring now to FIG. 1 there is illustrated the gas bag cover 10 provided on the inner side facing away from the vehicle occupant and towards a gas bag to be covered with a burst line 12 indicated in the drawing as a broken line. Fitted in a depression 14, roughly in the middle of the gas bag cover 10 is a badge 16.

Figure 2:
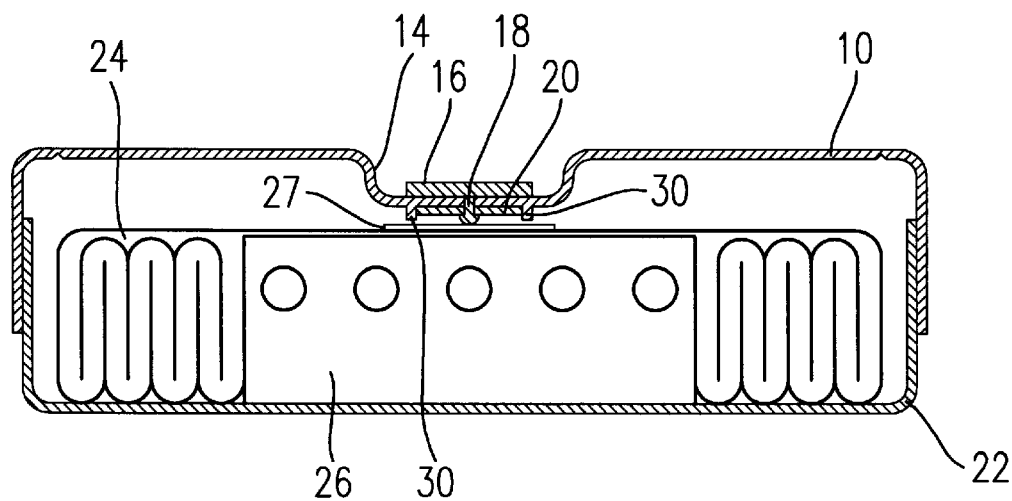
FIG. 2 is a cross-section through the gas bag cover as shown in FIG. 1 taken along the line II—II in FIG. 1.

Referring now to FIG. 2 there is illustrated how the badge 16 is secured in the usual way by means of a rivet 18 and a lockwasher 20 to the cover 10. The cover 10 is secured to a gas bag module comprising a housing 22, a gas bag 24 and an inflator 26. Located between the cover 10 and the gas bag 24 is a contact 27 for activating a horn. In the region of the burst line 12 the wall thickness of the cover 10 is reduced. Located in the run of the burst line 12 is the so-called initial point 28 at which the remaining wall thickness of the cover 10 has its minimum. This initial point 28 serves to establish a location in the cover 10 at which the bursting of the burst line 12 is to commence. Molded to the inner side of the cover 10 are ribs 30 extending along the line 32. The line 32 is guided around the lockwasher 20 of the badge 16 and forms a tangent to the initial point 28 in an elliptic curve. The ribs 30 are achievable at no additional expense in producing the cover 10.

When the gas bag 24 is inflated by the inflator 26 it begins to deploy and is urged against the cover 10, as a result of which the cover 10 expands outwardly, i.e. a stress materializing in the material of the cover 10. This stress peaks where the material thickness has a minimum, i.e. in the run of the burst line 12, more particularly at the initial point 28. However, also the opening in the cover 10 through which the rivet 18 protrudes constitutes a potential point at which a stress concentration could materialize. The stress is, however, guided by the greater material thickness in the region of the ribs 30 along the line 32 to the initial point 28 in bypassing the badge 16 so that the stress concentration occurs at the initial point 28 and the cover 10 first bursts at this location. Due to the notch effect of the burst line 12 it is assured that the cover 10 then opens in the manner as intended. Even if the burst should not propagate along the burst line 12 as intended it is prevented by the increased material thickness of the ribs 30 from spreading out under the badge 16. There is thus no risk of the badge 16 being released from the material of the cover 10.

A further advantage of the ribs 30 is that they reinforce the cover 10 so that the force needed to activate the contact 27 is better distributed.

It will readily be appreciated that the arrangement and run of the ribs is not, of course, limited to that shown in the embodiment. If needed, more ribs may also be provided.

What is claimed is:

1. A gas bag cover for a vehicle occupant restraint system, having an inner side facing a gas bag to be covered and a wall thickness, said gas bag cover comprising at least one burst line being grooved into said cover from said inner side up to a predefined remaining wall thickness, said burst line comprising a single initial point at which said remaining wall thickness has its minimum, said gas bag cover further comprising reinforcement ribs formed on said inner side of said cover, said reinforcement ribs extending along a line having an apex adjacent to said initial point.

2. The cover of claim 1, comprising a badge which is applied to said cover, said reinforcement ribs running around said badge.

3. A gas bag cover for covering a gas bag of a vehicle occupant restraint system, said system including a gas bag module having a housing for containing an inflatable gas bag and an inflator for supplying inflation fluid for inflating said inflatable gas bag, said cover comprising:

a wall having an inner surface for facing an inflatable gas bag to be covered and having a predetermined wall thickness, at least one burst line grooved into said wall from said inner surface up to a predefined remaining wall thickness less than said predetermined wall thickness, said burst line comprising a single initial point at which said remaining wall thickness is at a minimum relative to the remainder of the burst line, said cover including reinforcement ribs projecting from said inner surface of said wall, said reinforcement ribs extending along a line having an apex adjacent to said initial point, said reinforcement ribs defining an area of the cover and preventing a tearing of said cover in said area beyond said line, said cover tearing initially only at said single initial point upon inflation of said gas bag.

4. The cover of claim 3, further comprising an outer surface located opposite said inner surface, and a badge which is applied to a defined location on said outer surface and in said area, said reinforcement ribs extending on said inner surface and directly under the defined location of said badge and around said badge.

* * * * *